United States Patent [19]

Jennings, Jr. et al.

[11] Patent Number: 4,898,242
[45] Date of Patent: Feb. 6, 1990

[54] METHOD FOR SUSPENDING WELLS

[75] Inventors: Alfred R. Jennings, Jr., Plano, Tex.; Paul Shu, Princeton Junction, N.J.

[73] Assignee: Mobil Oil Corporation, New York, N.Y.

[21] Appl. No.: 179,728

[22] Filed: Apr. 11, 1988

Related U.S. Application Data

[63] Continuation-in-part of Ser. No. 890,679, Jul. 30, 1986, Pat. No. 4,817,719.

[51] Int. Cl.$^4$ .............................................. E21B 33/13
[52] U.S. Cl. ..................................... 166/285; 166/292; 166/295
[58] Field of Search ............... 166/285, 291, 292, 294, 166/295

[56] References Cited

U.S. PATENT DOCUMENTS

| | | | |
|---|---|---|---|
| 3,447,608 | 6/1969 | Fry et al. | 166/294 X |
| 3,866,683 | 2/1975 | Maly et al. | 166/292 |
| 4,639,499 | 1/1987 | Höhlein et al. | 526/285 |

OTHER PUBLICATIONS

Chemical Stability of Polyacrylamide Under Simulated Field Conditions, Yang et al., SPE 14232, 1985.

Primary Examiner—William P. Neuder
Attorney, Agent, or Firm—Alexander J. McKillop; Charles J. Speciale; Charles A. Malone

[57] ABSTRACT

A process for killing and suspending mixtures of hydrocarbonaceous fluid production, particularly oil, in a formation containing same which minimizes formation damage. First, a "spacer volume" of liquid containing a surfactant is directed into the formation's productive interval. Thereafter, a solidifiable pumpable gel mixture is placed via a wellbore into the formation's productive interval and also within said wellbore. Said mixture solidifies in the formation and forms a gel plug within the wellbore. Thereafter, a light weight cement is placed over said gel plug effectively "killing" and suspending the production of hydrocarbonaceous fluids. The gel mixture comprises (1) water; (2) a cross linkable polymer having at least one functional group selected form a member of the group consisting of an amide, an amine, a hydroxyl, or a thiol group; and (3) a partially methylated aminoplast resin which cross links with said polymer.

31 Claims, 1 Drawing Sheet

METHOD FOR SUSPENDING WELLS

CROSS-REFERENCE TO RELATED APPLICATIONS

This application is a continuation-in-part of Application Ser. No. 890,679, filed July 30, 1986, now U.S. Pat. No. 4,817,719 and is related to Application Ser. No. 917,324, filed Oct. 9, 1986, now U.S. Pat. No. 4,834,180 and Application Ser. No. 138,176, filed Dec. 28, 1987 now U.S. Pat. No. 4,813,484.

FIELD OF THE INVENTION

This invention is directed to a method for minimizing formation damage when a well is "killed" and production is suspended.

BACKGROUND OF THE INVENTION

When productive intervals are completed in exploratory wells, it is common practice to "suspend" wells for a period of time to allow construction of pipelines and gathering facilities in conjunction with field development. In remote locations (offshore, e.g.), it may even be necessary to plug and abandon zones found productive until development wells can be drilled.

In many cases, it is not known how long a well may be suspended. Therefore, thorough measures are taken to isolate the productive interval from the surface. For example, following a flow test of the zone indicating productivity at commercial rates, the zone will be "killed" with completion fluid, a bridge plug set above the perforated interval, and a cement plug placed on top of the bridge plug. Two or three additional bridge plug/cement plug combinations may be placed above the interval to insure zone isolation during suspension.

When the suspended well is re-entered to open the interval to production, the plugs must be drilled out. Frequently this results in substantial loss of drilling fluid to the zone. This is especially true if the zone was stimulated (fracturing or acidizing, e.g.) as part of the initial well test program. Once the plugs are drilled out, the zone is opened to production. Usually, a lower rate than the initial test rate is observed because of damage which occurred during re-entry.

Therefore, what is needed is a method which will allow a producing well to be "killed" and suspended without causing undue formation damage. Utilization of said method would result in maintaining the producing rate near that initially determined. Well re-entry costs would be reduced, and formation damage minimized.

SUMMARY OF THE INVENTION

This invention is directed to a method for "killing" and suspending oil production in a well which results in a reduction in formation damage. In the practice of this method, a "spacer volume" of liquid containing a surfactant is directed into the formation's productive interval. Thereafter, a pumpable solidifiable gel mixture is placed into the wellbore substantially at the formation's productive interval. The gel mixture which is utilized herein comprises (a) water; (2) a cross linkable polymer having at least one functional group selected from a member of the group consisting of an amine, an amide, a hydroxyl, or a thiol group; and (3) a partially methylated aminoplast resin which cross links with said polymer.

Subsequently, the gel mixture solidifies after entering said productive interval of the formation while causing a solid gel plug to form in the wellbore substantially in the area of the wellbore's productive interval. Said solidified gel mixture within the formation and the wellbore is sufficient to withstand environmental conditions in the formation depths, including pressures. As a result of the solidified gel mixture in the formation and gel plug within the wellbore, oil and other hydrocarbonaceous fluids cease to flow from the formation into said wellbore, thus "killing" the well.

Thereafter, the depth of the top of the solid gel plug is determined so that a desired amount of light (low density) concrete can be placed over said gel plug. Next, a desired amount of a light concrete is placed over said gel plug in an amount sufficient to suspend the production of hydrocarbonaceous fluids from said formation to the surface.

It is therefore an object of this invention to eliminate the need for a kill or completion fluid when "killing" a well.

It is another object of this invention to eliminate the need for a bridge plug when well production is suspended.

It is yet another object of this invention to minimize formation damage resultant from loss of drilling fluid which in prior art methods often entered the productive interval of a formation thereby decreasing the formation's permeability.

It is a yet further object of this invention to reduce well re-entry costs upon termination of the well suspension period.

It is a still yet further object of this invention to maintain the production rate substantially near the initial production rate upon termination of the well suspension period.

It is a still yet further object of this invention to pump the required materials into the wellbore without the need to circulate them into and out of the wellbore as was required in prior art methods.

It is even yet another object of this invention to provide a gelation reaction which can proceed under all pH conditions encountered in a hydrocarbonaceous reservoir.

It is even then yet a further object of this invention to provide for a substantially stable gel when high temperatures are encountered in a reservoir.

It is even then yet a still further object of this invention to provide for a gelation reaction which will proceed in a saline hydrocarbonaceous reservoir environment.

DESCRIPTION OF THE PREFERRED EMBODIMENTS

Figure 1:
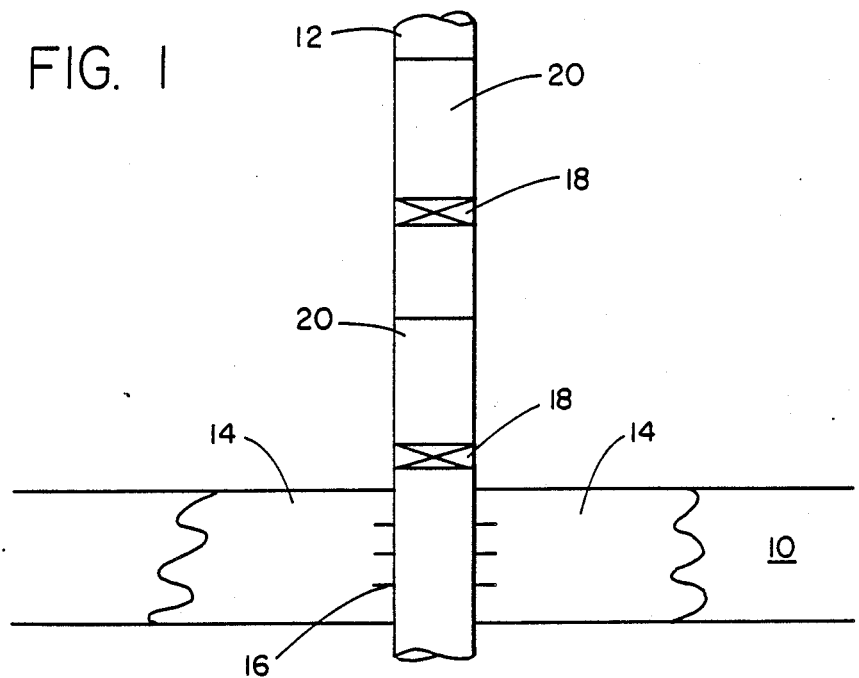
FIG. 1 is schematic representation of a prior art method for "killing" and suspending oil production in a well.

When "killing" a productive interval of a well, as shown in FIG. 1, a kill fluid 14 is generally injected in wellbore 12. Said kill fluid enters formation 10 via perforations 16 "drowning" the productive interval in formation 10. Thereafter, a bridge plug 18, which is generally of a metallic construction, is caused to bind securely against wellbore 12. Once bridge plug 18 is securely bound, a cement plug 20 hardens and with the bridge plug causes the productive interval of wellbore 12 to be closed to the surface and thereby suspends oil production into said wellbore. To more effectively secure the productive interval against oil production, multiple cement plug/bridge plug combinations can be utilized in wellbore 12 as is shown in FIG. 1.

In the practice of this invention, a spacer volume of a liquid is pumped directly into the wellhead. The spacer volume of liquid is used to clear the formation and well of materials which might interfere with adherence and solidification of the gel mixture. Generally, about two wellbore tubing volumes of fluid will be sufficient to clear and condition said formation and wellbore. Fluids which can be used to make up the spacer volume of liquid comprise completion brine, formation brine, potassium chloride, and fluids with similar chemical composition. Placement of the spacer volume of liquid into the formation also substantially inhibits production of hydrocarbonaceous fluids when performing the subsequent steps of this invention. As is known to those skilled in the art, the pumping or injection rates utilized should be maintained below those rates which will create a pressure sufficient to fracture the formation. The spacer volume of liquid utilized can comprise a surfactant, preferably an aqueous surfactant, in a concentration of from about 0.10 to preferably about 1.0 volume percent. Some surfactants which can be utilized are mentioned in Clampitt, U.S. Pat. No. 4,300,634, which is hereby incorporated by reference. Other compounds which can be utilized include methanol and isopropanol. When used, these compounds should be incorporated into the spacer volume of liquid in an amount of from about 5 to about 50 volume percent, preferably about 20 percent. Upon incorporation of these compounds in the spacer volume of liquid which is injected via the wellbore 12 into formation 10, said compounds have the ability to minimize fluid retention, and condition the formation for greater receptivity of a solidifiable pumpable gel mixture.

Figure 2:
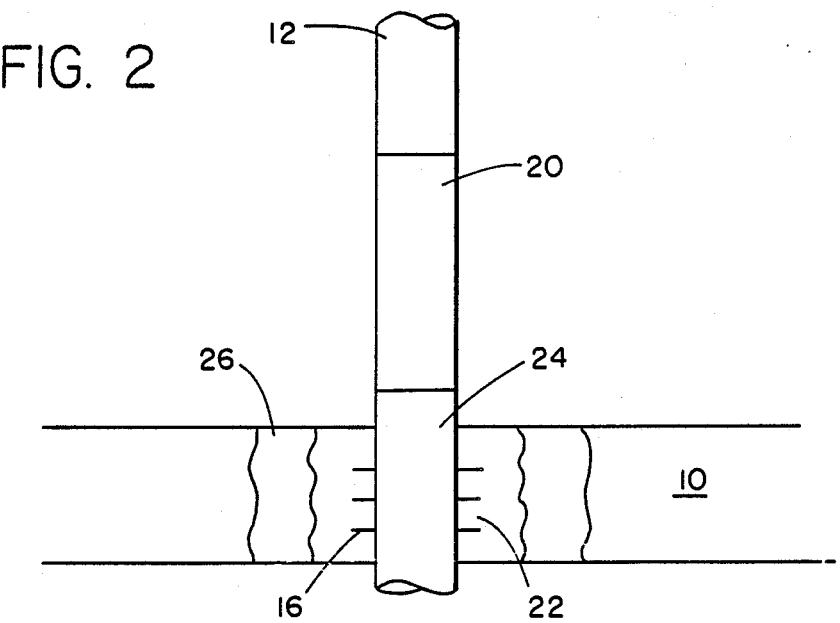
FIG. 2 is a schematic representation of the method which is disclosed herein.

Afterwards, as is shown in FIG. 2, a pumpable solidifiable gel mixture is directed into wellbore 12, usually by pumping it into the wellhead. Said gel mixture is allowed to flow down wellbore 12 in formation 10 until it comes in contact with the productive interval of formation 10. The injection or pumping rates should be maintained below those pressures which will cause the formation to fracture. At the productive interval, said gel mixture enters the productive interval of formation 10 via perforations 16. Sufficient solidifiable gel is allowed to enter said productive interval thereby closing off said interval to production of hydrocarbonaceous fluid mixtures, particularly oil. Additional solidifiable gel material is allowed to enter wellbore 12 which material contacts said productive interval until said gel has filled wellbore 12 above the productive interval.

The solidifiable gel mixture subsequently forms a solid gel plug 24 within wellbore 12. It also forms a solid formation gel 22 in the productive interval of formation 10. Gel plug 24, upon solidification, is of a composition and strength sufficient to support a cement plug 20 thereabove in addition to forming an impermeable barrier to the flow of fluids from the productive interval. Cement plug 20 is comprised on a light cement. Representative cements are foamed cements and a light weight (low density) cement sold by Haliburton under the Spherelite tradename. Similar cement compositions are disclosed in U.S. Pat. Nos. 3,902,911 and 4,120,360 which are hereby incorporated by reference. Upon hardening, the cement forms a further impermeable barrier to the flow of fluids from the productive interval of formation 10. As will be understood by those skilled in the art, quantities of "spacer" volumes of liquid 26, said gel mixture, and a light weight cement will vary depending on formation parameters encountered. Also, a solidified gel plug, and a cement plug can be alternated in wellbore 12 until a sufficient number have been placed depending on the productive interval depth and length of the suspension period.

After the gel plug and light-weight cement plug have set, a pressure test is applied to the plug combination to insure competency and the desired plugging effect. Upon confirmation of the competency and plugging effect, the distance from the wellhead to the final light-weight cement plug is determined for re-entry at a later date. This determination can be made by running a dummy or wireline into wellbore 12. When it is desired to commence production of hydrocarbonaceous fluids from said formation, cement plug 20 is drilled out and gel plug 24 caused to be removed. Said removal can be accomplished by mechanical or chemical means. Since the productive interval of formation 10 is closed from wellbore 12 by the solidified gel, any pressurized drilling fluid utilized to remove cement plug 20 from wellbore 12 will not enter the productive interval and damage it.

Since a kill fluid is not utilized in this invention, hydrocarbonaceous fluids, particularly oil, are produced through said productive interval at substantially the initial production rate once production resumes. Re-entry costs are substantially reduced since more costly drill bits are not required as a metallic bridge plug is not used.

One method of making a suitable pumpable mixture is discussed in U.S. Pat. No. 4,333,461 issued to Muller on June 8, 1982 which is hereby incorporated by reference. The stability and rigidity of gel plug 24 will depend upon the physical and chemical characteristics of the gel plug. As is known to those skilled in the art, gel plug 24 should be of a stability and rigidity which will withstand the weight of cement plug 20 and environmental well conditions.

Often, it will be necessary to increase the density of the pumpable gel to obtain the desired stability and rigidity therein. To accomplish this, a solid non-reacting material can be added to the pumpable gel mixture. Preferred non-reacting solid materials include solid rock salt, calcium carbonate, and suitably crushed mollusk shells, such as oyster shells.

Other gel mixtures can be used to obtain a desired stability and rigidity. A preferred mixture used to obtain the desired stability and rigidity, for example, is a polymer having functional groups such as $NH_2$, $-CONH_2$, $-OH$, $-SH$ which can be gelled with methylated MF resins. Some acceptable polymers include polyacrylamide, Kelco's S-130 biopolymer, acrylamide modified polyvinyl alcohol ("AMPVA"), Xanthan biopolymers, poly (acrylamide-co-acryl-amido-2-methyl-propanesulfonate) "AM-AMPS", "Phillips HE" polymers (a family of acrylamide containing copolymers), and polyvinyl alcohol. "Phillips HE" polymer comprises copolymers of N-vinyl-2-pyrrolidone (VP) and acrylamide (AM) in which the weight ratios of VP:AM preferably range from about 30:70 to about 70:30. Said polymer is discussed in U.S. Pat. No. 4,644,020 which issued to Stahl on Feb. 17, 1987. This patent is hereby incorporated by reference herein. Polymers mentioned in U.S.

Pat. No. 4,157,322, supra, may be utilized as long as those polymers contain the functional groups above mentioned. Polymer concentration in said gels range from about 0.1 to about 5.0 wt. percent. These polymer concentrations vary depending upon the molecular weight of polymer used. Lower molecular weight polymers require higher polymer concentration to gel. A polymer concentration of about 0.2–5.0 wt. percent is preferred. This crosslinking/co-gelation method produces high integrity polymer gels able to withstand high temperatures and high salinity conditions often found in subterranean hydrocarbonaceous formations.

Methylated MF derived as a reaction product of melamine and formaldehyde has a molar ratio of between 1–6. A ratio of 3–6 is commonly found in commercial resins. The methyol group, —$CH_2OH$ and its methylated varieties are reactive to various functional groups such as $NH_2$, —$CONH_2$, —OH, —SH and can also self-condense to form cured resins. Its preparation is convenient and well documented in preparative polymer manuals.

The melamine resin that is utilized in this invention can be a commercial product such as Cyanamid's Parez resins. Included among these melamine-formaldehyde (melamine) resins which are useful in this invention are the partially methylated resins and the hexamethoxymethyl resins (i.e., American Cyanamid's Parez, Cymel ™ 373, Cymel 370, Cymel 303, and Cymel 380). The resin, however, has to be one that is soluble or dispersible in an aqueous medium. Other amino resins can also be used. Non-limiting examples are urea-formaldehyde, ethylene and propylene urea formaldehyde, trizone, uran, and glyoxal resins. The amount of MF resins required for adequate gel formation is in the ratio of 10:1–1:10 polymer to amino resins. Preferred polymer concentrations are from about 0.2 to about 5.0 wt. percent. Amino resins are preferred crosslinkers because they (1) are economical to use; (2) can be applied to a wide variety of polymers; (3) form thermally stable, brine tolerant gels; and (4) do not need an acid or base catalyst.

The gelation rate of the composition depends on the amount of each of the components and the temperature at which the reaction is conducted. Thus, one can tailor the gel rate and gel strength of the composition by adjusting the amount of polymer, the resin amount and the temperature. The higher the temperature at given concentrations of resin and polymer, the faster the gelation time. If a thicker gelled composition is desired, the polymer and resin concentrations may be increased for a given temperature.

Gels resultant from the gelation reaction were formed in about a 15 to 30 wt. % brine solution containing at least about 1500 ppm Ca(II) and at least 500 ppm Mg(II). Said formed gels were stable as determined by sustained gel integrity and low gel shrinkage at least about 195° F. for at least three months. Examples of preferred gel compositions are set forth below.

| Gelation of Melamine - Formaldehyde Crosslinker | | | | |
|---|---|---|---|---|
| Example | Polymer | 30% Brine[8] | Deionized Water | Parez 613[1] |
| | 10% AMPVA[2] | | | |
| #1 | 5 g | 5 g | 0 | 0.4 g |
| #2 | 2.5 g | 5 g | 2.5 g | 0.4 g |
| | AMPS-AMPVA[3] 10% | | | |
| #3 | 2.5 g | 5 g | 2.5 g | 0.4 g |
| #4 | 5 g | 5 g | 0 | 0.4 g |
| | PVA[4] 5% | | | |
| #5 | 5 g | 2.5 g | 2.5 g | 0.4 g |
| | AMPS-PVA[5] 10% | | | |
| #6 | 5 g | 2.5 g | 2.5 g | 0.4 g |
| | Magnifloc[6] 1% | | | |
| #7 | 5 g | 5 g | 0 | 0.4 g |
| #8 | 5 g | 2.5 g | 2.5 g | 0.4 g |
| | AM-AMPS[7] 1% | | | |
| #9 | 5 g | 5 g | 0 | 0.4 g |
| #10 | 2.5 g | 5 g | 2.5 g | 0.4 g |

| Gelation with Trimethylolmelamine (TM) | | | | |
|---|---|---|---|---|
| Example | Polymer | 30% Brine[8] | Deionized Water | TM |
| | S-130 1%[9] | | | |
| #11 | 5 g | 5 g | — | 0.4 g |
| #12 | 5 g | 5 g | — | 0.2 g |
| #13 | 2.5 g | 5 g | 2.5 g | 0.4 g |
| #14 | 2.5 g | 5 g | 2.5 g | 0.4 g |
| | HE E 2%[10] | | | |
| #15 | 2.5 g | 5 g | 2.5 g | 0.4 g |
| #16 | 2.5 g | 5 g | 2.5 g | 0.2 g |
| | Xanthan[11] 2% | | | |
| #17 | 2.5 g | 5 g | 2.5 g | 0.4 g |
| #18 | 2.5 g | 5 g | 2.5 g | 0.2 g |

[1] A commercial 80% active amino resin obtainable from American Cyanamid
[2] Acrylamide modified polyvinyl alcohol
[3] Acrylamido-2-methyl-propanesulfonate/acrylamide modified polyvinyl alcohol
[4] Polyvinyl alcohol
[5] Acrylamido-2-methyl-propanesulfonate/polyvinyl alcohol
[6] Polyacrylamide obtained from American Cyanamid
[7] Poly (acrylamide-co-acrylamido-2-methyl-propanesulfate)
[8] 30% NaCl, 2000 ppm Ca, 1000 ppm Mg
[9] Kelco "S-130" biopolymer
[10] Phillips HE
[11] Pfizer Flocon biopolymer Cement plug 20 can be removed from wellbore 12 by drilling. However, formation gel 22 and gel plug 24 can also be removed in several other ways. Several variations are provided for. One variation, which can be utilized to facilitate removal of the gel plug 24 from wellbore 12 and formation gel 22 is to form a solid gel plug 24 or formation gel 22 containing a gel breaker. This gel breaker, included in the gel mixture, is selected from a group of chemical compounds which can break down the solid gel to temperatures of less than from about 60° F. to about 250° F. Generally, this breakdown will occur within from about 2 hours to about 24 hours depending upon type and concentration of breaker added. Chemicals satisfactory for use as gel breaker, and which are incorporated into the gel mixture, include enzymes and oxidizing agents (such as sodium persulfate) suitable for breaking down the solid gel. Other gel breakers sufficient for this purpose are discussed in U.S. Pat. No. 4,265,311 issued to Ely on May 5, 1981, which patent is hereby incorporated by reference. These chemicals are readily available from chemical suppliers and with the exception of enzyme breakers are sold under their chemical names. Enzyme breakers can be obtained from oil field service companies. The concentration of gel breaker incorporated into the gel mixture will vary from about 0.01 weight percent to about 0.10 weight percent, preferably about 0.05 weight percent of the gel mixture. Upon cooling to a temperature of from about 60° F. to about 150° F., the gel breaker will breakdown the solid gel causing it to liquify which will facilitate removal of gel plug 24 and formation gel 22.

Another method for breaking the gel is to contact the solidified gel with a mineral acid after a suitable or desired time interval. In those instances where it is undesirable to have a gel breaker incorporated into the gel mixture to remove solid gel plug 24 or formation gel 22, it is preferred to use hydrochloric acid of a strength sufficient to solubilize the solid gel plug 24 and formation gel 22 without attacking formation 10. Hydrochloric acid, and acids similar thereto, can be used to breakdown the solid gel on contact. Hydrochloric acid of a concentration of about 10 percent to about 28 percent preferably about 15 percent, by volume of solution, will generally be sufficient for this purpose. Although hydrochloric acid has been mentioned, other similar mineral acids and strong organic acids may be employed depending upon their availability, as is known to those skilled in the art.

Although the present invention has been described with preferred embodiments, it is to be understood that modifications and variations may be resorted to without departing from the spirit and scope of this invention, as those skilled in the art will readily understand. Such modifications and variations are considered to be within the purview and scope of the appended claims.

We claim:

1. A method for shutting in a well which minimizes formation damage comprising:
   (a) placing into a formation a liquid solution sufficient to establish fluid flow into said formation which solution also minimizes fluid retention;
   (b) pumping a solidifiable gel mixture into the productive interval of a formation via a wellbore where said mixture comprises
      (i) water,
      (ii) 0.2 to 5.0 wt. percent of a cross linkable polymer having at least one functional group selected from a member of the group consisting of an amine, an amide, a hydroxyl, or a thiol group, and
      (iii) 0.02 to 50.0 wt. percent of a partially methylated aminoplast resin which cross links with said polymer;
   (c) causing said gel mixture to become a solid thereby forming a gel plug within said wellbore and a formation gel within said formation sufficient to withstand environmental formation conditions and pressures which cause hydrocarbonaceous fluids to flow into said wellbore from the formation areas near said wellbore;
   (d) placing in said wellbore on top of said plug an amount of cement sufficient to isolate said productive interval when said cement hardens while being supported by said plug; and
   (e) allowing said cement to set which set cement in combination with said gel plug is competent to exclude production fluids from said wellbore.

2. The method as recited in claim 1 wherein said resin is a member selected from the group consisting of melamine-formaldehyde, urea formaldehyde, ethylene urea formaldehyde, propylene urea formaldehyde, triazone, uran, and glyoxal.

3. The method as recited in claim 1 where said polymer is a member selected from the group consisting of polyacrylamide, polyvinyl alcohol, Xanthan biopolymers, Kelco S-130 biopolymer, poly (acrylamide-co-acrylamido-2-methyl-propanesulfonate), Phillips HE polymers, and acrylamide modified polyvinyl alcohol.

4. The method as recited in claim 1 wherein the ratio of polymer to said resin required for gelation is from about 10:1 to about 1:10.

5. The method as recited in claim 1 where said matter comprises a gel which is formed under salinity concentrations encountered in an oil reservoir.

6. The method as recited in claim 1 where said matter comprises a gel of substantial stability which is able to withstand high temperatures encountered in an oil reservoir for at least three months.

7. The method as recited in claim 1 where said mixture forms a gel which is unaffected by carbonate, bicarbonate, and sulfate anions encountered in an oil reservoir.

8. The method as recited in claim 1 where said resin can condense to form a cured resin.

9. The method as recited in claim 1 where said mixture comprises a gelation reaction which proceeds under substantially all pH conditions.

10. The method as recited in claim 1, where multiple gel plugs and cement plugs are used alternately to exclude production fluids from said wellbore where said formation has multiple production intervals.

11. The method as recited in claim 1, where said cement is drilled out, said solid gel plug and formation gel are liquefied via gel breakers and removed from said wellbore.

12. The method as recited in claim 1, where said solid gel plug and solid formation gel are removed by hydrochloroic acid.

13. The method as recited in claim 1, where in step (c) said gel mixture forms a solid sufficient to withstand formation pressure from about 1,000 psig to about 80,000 psig and withstands temperatures greater than about 190° F.

14. The method as recited in claim 1 where said liquid solution is selected from a member of the group consisting of completion brine, formation brines, potassium chloride, fluids with similar chemical composition, and mixtures thereof.

15. The method as recited in claim 1 where said liquid additionally contains a surfactant, methanol, or isopropanol.

16. The method as recited in claim 1 wherein step (a) said liquid solution comprises a surfactant in an amount of from about 0.10 volume percent to about 1.0 volume percent.

17. The method as recited in claim 1 where said cement comprises a light weight or foamed cement.

18. A method for killing a well and suspending oil production therein, whereby formation damage is minimized comprising:
   (a) placing into a formation a liquid solution sufficient to establish fluid flow into said formation which solution also minimizes fluid retention where said liquid is a member selected from the group consisting of completion brine, formation brines, potassium chloride, fluids with similar chemical compositions, and mixtures thereof which liquid additionally contains a surfactant, methanol, or isopropanol;
   (b) pumping a solidifiable gel mixture into the productive interval of said formation via a wellbore where said mixture comprises
      (i) water,
      (ii) 0.2 to 5.0 wt. percent of a cross linkable polymer having at least one functional group selected from a member of the group consisting of an amine, an amide, a hydroxyl, or a thiol group, and (iii) 0.02 to 50.0 wt. percent of a partially methylated aminoplast resin which cross links with said polymer;

(c) causing said gel mixture to become a solid, thereby forming a gel plug within said wellbore and a formation gel within said formation sufficient to withstand environmental formation conditions and pressures which cause hydrocarbonaceous fluids to flow into said wellbore from the formation areas near said wellbore;

(d) placing in said wellbore on top of said plug an amount of cement sufficient to isolate said productive interval when said cement hardens while being supported by said plug;

(e) allowing said cement to set which set cement in combination with said gel plug is competent to exclude productive fluids from said wellbore;

(f) causing said solid formation gel, said gel plug, and said hardened cement to be removed after the well has been shut in for a desired time interval; and (g) producing thereafter hydrocarbonaceous fluids from said formation via said wellbore.

19. The method as recited in claim 18 wherein said resin is a member selected from the group consisting of melamine-formaldehyde, urea formaldehyde, ethylene urea formaldehyde, propylene urea formaldehyde, triazone, uran, and glyoxal.

20. The method as recited in claim 18 where said polymer is a member selected from the group consisting of polyacrylamide, polyvinyl alcohol, Xanthan biopolymers, Kelco S-130 biopolymer, poly (acrylamide-co-acrylamido-2-methyl-propanesulfonate), Phillips HE polymers, and acrylamide modified polyvinyl alcohol.

21. The method as recited in claim 18 wherein the ratio of polymer to said resin required for gelation is from about 10:1 to about 1:10.

22. The method as recited in claim 18 where said matter comprises a gel which is formed under salinity concentrations encountered in an oil reservoir.

23. The method as recited in claim 18 where said matter comprises a gel of substantial stability which is able to withstand high temperatures encountered in an oil reservoir for at least three months.

24. The method as recited in claim 18 where said mixture forms a gel which is unaffected by carbonate, bicarbonate, and sulfate anions encountered in an oil reservoir.

25. The method as recited in claim 18 where said resin can condense to form a cured resin.

26. The method as recited in claim 18 where said mixture comprises a gelation reaction which proceeds under substantially all pH conditions.

27. The method as recited in claim 18, where multiple gel plugs and cement plugs are used alternately to exclude production fluids from said wellbore where said formation has multiple production intervals.

28. The method as recited in claim 18, where said cement is drilled out, said solid gel plug and formation gel are liquefied via gel breakers and removed from said wellbore.

29. The method as recited in claim 18, where said solid gel plug and solid formation gel are removed by hydrochloric acid.

30. The method as recited in claim 18, where in step (c) said gel mixture forms a solid sufficient to withstand formation pressure from about 1,000 psig to about 80,000 psig and withstands temperatures greater than about 190° F.

31. The method as recited in claim 18 where said surfactant is contained in said liquid is from about 0.10 to about 1.0 volume percent and where methanol or isopropyl and mixtures thereof are contained therein in from about 5 to about 50 volume percent.

* * * * *